US010647211B2

(12) United States Patent
Ogaki et al.

(10) Patent No.: US 10,647,211 B2
(45) Date of Patent: May 12, 2020

(54) POWER CONSUMPTION CONTROL DEVICE

(71) Applicant: HONDA MOTOR CO., LTD., Tokyo (JP)

(72) Inventors: Toru Ogaki, Saitama (JP); Eiki Kamaya, Saitama (JP); Yoshikazu Kemmoku, Saitama (JP); Keisuke Fujimaki, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 78 days.

(21) Appl. No.: 15/763,584

(22) PCT Filed: Sep. 28, 2015

(86) PCT No.: PCT/JP2015/077365
§ 371 (c)(1),
(2) Date: Mar. 27, 2018

(87) PCT Pub. No.: WO2017/056162
PCT Pub. Date: Apr. 6, 2017

(65) Prior Publication Data
US 2018/0281618 A1 Oct. 4, 2018

(51) Int. Cl.
H01M 10/42 (2006.01)
H01M 10/44 (2006.01)
(Continued)

(52) U.S. Cl.
CPC .......... B60L 11/1875 (2013.01); B60L 53/14 (2019.02); B60L 53/22 (2019.02); B60L 58/12 (2019.02);
(Continued)

(58) Field of Classification Search
USPC .................................. 307/10.1, 9.1
See application file for complete search history.

(56) References Cited

U.S. PATENT DOCUMENTS

2012/0123626 A1* 5/2012 Takahashi .............. B60L 58/27
701/22
2014/0002025 A1* 1/2014 Yamamoto .......... H01M 10/443
320/109
(Continued)

FOREIGN PATENT DOCUMENTS

JP   H03-049168 A   3/1991
JP   H06-233466 A   8/1994
(Continued)

OTHER PUBLICATIONS

Apr. 23, 2019, Japanese Office Action issued for related JP Application No. 2017-542534.
(Continued)

Primary Examiner — Rexford N Barnie
Assistant Examiner — Xuan Ly
(74) Attorney, Agent, or Firm — Paratus Law Group, PLLC

(57) ABSTRACT

A power consumption control device includes: a storage battery configured to supply power to an electric motor of a plug-in electric motor vehicle; a heating unit configured to heat the storage battery using heat generated through current flowing; a power conversion unit configured to convert power supplied from an external power supply; an estimation unit configured to estimate a change in effective capacity of the storage battery when the heating unit generates heat through current flowing by the power supplied from the external power supply and raises the temperature of the storage battery to a target temperature, based on an effective capacity corresponding to the temperature and SOC of the storage battery; and a controller configured to control usage of the power converted by the power conversion unit according to the change of the effective capacity, estimated by the estimation unit.

8 Claims, 13 Drawing Sheets

(51) Int. Cl.
   *H01M 10/625* (2014.01)
   *H01M 10/633* (2014.01)
   *H01M 10/6571* (2014.01)
   *H01M 10/48* (2006.01)
   *H01M 10/615* (2014.01)
   *B60L 11/18* (2006.01)
   *B60L 53/22* (2019.01)
   *B60L 53/14* (2019.01)
   *H01M 10/657* (2014.01)
   *B60L 58/27* (2019.01)
   *B60L 58/12* (2019.01)
   *H02J 7/00* (2006.01)

(52) U.S. Cl.
   CPC ........... *B60L 58/27* (2019.02); *H01M 10/425* (2013.01); *H01M 10/44* (2013.01); *H01M 10/443* (2013.01); *H01M 10/48* (2013.01); *H01M 10/615* (2015.04); *H01M 10/625* (2015.04); *H01M 10/633* (2015.04); *H01M 10/657* (2015.04); *H01M 10/6571* (2015.04); *B60L 2240/36* (2013.01); *H01M 10/486* (2013.01); *H01M 2010/4271* (2013.01); *H01M 2220/20* (2013.01); *H02J 7/00* (2013.01); *Y02T 10/7005* (2013.01); *Y02T 10/7022* (2013.01)

(56) References Cited

U.S. PATENT DOCUMENTS

2014/0008348 A1\* 1/2014 Otsuka ............... H01M 10/486
                                                                    219/209
2014/0333267 A1    11/2014 Crawley

FOREIGN PATENT DOCUMENTS

| | | | |
|---|---|---|---|
| JP | 2001-128384 | A | 5/2001 |
| JP | 2006-155916 | A | 6/2006 |
| JP | 2006155916 | \* | 6/2006 |
| JP | 2010-113942 | A | 5/2010 |
| JP | 2011-018531 | A | 1/2011 |
| JP | 2012-133900 | A | 7/2012 |
| JP | 2012-178899 | A | 9/2012 |
| JP | 2012-191784 | A | 10/2012 |
| JP | 2012-209213 | A | 10/2012 |

OTHER PUBLICATIONS

Nov. 2, 2015, International Search Report issued for related PCT application No. PCT/JP2015/077365.
Nov. 2, 2015, International Search Opinion issued for related PCT application No. PCT/JP2015/077365.

\* cited by examiner

POWER CONSUMPTION CONTROL DEVICE

CROSS REFERENCE TO PRIOR APPLICATION

This application is a National Stage Patent Application of PCT International Patent Application No. PCT/JP2015/077365 (filed on Sep. 28, 2015) under 35 U.S.C. § 371, which is hereby incorporated by reference in its entirety.

TECHNICAL FIELD

The present invention relates to a power consumption control device in a plug-in electric motor vehicle.

BACKGROUND ART

Patent Literature 1 discloses an electric motor vehicle charging system which raises the temperature of a storage battery using heat transferred from a heat storage material provided in an electric motor vehicle, depending on the temperature of the storage battery, when charging the storage battery of the electric motor vehicle. Since the electric motor vehicle charging system can heat the storage battery using the heat storage material provided in the electric motor vehicle, the electric motor vehicle charging system does not need to spare a part of charging power in order to secure power for heating, when charging the storage battery. When the temperature of the storage battery is low, the electric motor vehicle charging system needs to heat the storage battery in order to prevent a reduction in performance of the storage battery by charging. At this time, however, since a heat source is supplied from the heat storage material provided in the electric motor vehicle, the storage battery can be efficiently charged with power supplied from home.

PRIOR ART LITERATURE

Patent Literature

Patent Literature 1: JP-A-2012-209213

SUMMARY OF THE INVENTION

Problems that the Invention is to Solve

According to the electric motor vehicle charging system disclosed in Patent Literature 1, the so-called plug-in electric motor vehicle which is charged with power supplied from home includes the heat storage material as well as the storage battery, in order to preheat the storage battery using heat transferred from the heat storage material before the storage battery is charged. The preheating is performed to prevent a reduction in performance of the storage battery, which may occur when the storage battery is charged at low temperature.

However, even when the storage battery is discharged at low temperature, a reduction in performance of the storage battery may occur in the same manner as the storage battery is charged. For example, although the state of charge (SOC) of the storage battery is high as illustrated in FIG. 14, the effective capacity of the storage battery may be reduced at temperatures below zero. Therefore, when the ambient temperature of the storage battery is low, the storage battery may be preferably heated before discharging is performed.

When the storage battery is heated while the plug-in electric motor vehicle is parked, power from an external power supply is mainly used in a case where the electric motor vehicle is plugged in. However, when the vehicle is not plugged in, power of the storage battery provided in the electric motor vehicle is used. As such, the power is used as the energy for heating the storage battery while the electric motor vehicle is parked. Furthermore, when the electric motor vehicle is either plugged in or not plugged in, power is consumed to heat the storage battery.

An object of the present invention is to provide a power consumption control device capable of efficiently consuming power required for heating a storage battery, in order to improve the performance of the storage battery.

Means for Solving the Problem

With a view to achieving the object, there is provided (1) a power consumption control device including:
 a storage battery (e.g., a storage battery 130 in an embodiment to be described) configured to supply power to an electric motor serving as a driving source of a plug-in electric motor vehicle;
 a heating unit (e.g., a heater 115 in the embodiment to be described) configured to heat the storage battery using heat generated through current flowing;
 a power conversion unit (e.g., a charger 113 in the embodiment to be described) configured to convert power supplied from an external power supply, and perform at least either charging the storage battery or causing current to flow through the heating unit;
 an effective capacity estimation unit (e.g., an effective capacity change estimation unit 165 in the embodiment to be described) configured to estimate a change in effective capacity of the storage battery when the heating unit generates heat through current flowing due to the power supplied from the external power supply and raises the temperature of the storage battery to a target temperature, based on the effective capacity of the storage battery corresponding to the temperature and a state of charge (SOC) of the storage battery; and
 a first controller e.g., a current flow controller 167 in the embodiment to be described) configured to control usage of the power converted by the power conversion unit according to the change of the effective capacity estimated by the effective capacity estimation unit.

There is also provided (2), based on (1), the power consumption control device, wherein
 the change of the effective capacity estimated by the effective capacity estimation unit includes a change from an effective capacity corresponding to the temperature and the SOC of the storage battery before being heated by the heating unit to an effective capacity corresponding to the target temperature and the SOC of the storage battery, and
 when the change of the effective capacity increases by a predetermined amount or more, the first controller causes current to flow to the heating unit from the external power supply until the temperature of the storage battery reaches the target temperature.

There is further provided (3), based on (2), the power consumption control device, wherein
 when the temperature of the storage battery is lower than a lower limit temperature and the change of the effective capacity increases by less than the predetermined amount, the first controller causes current to flow to the heating unit from the external power supply until the temperature of the storage battery reaches the lower limit temperature, and charges the storage battery with power acquired from the external power supply after the temperature of the storage battery reaches the lower limit temperature.

There is further provided (4), based on any one (1) to (3), the power consumption control device further including:
- a charging controller (e.g., an ECU 121 in the embodiment to be described) configured to control the power conversion unit to start the charging of the storage battery at a designated time; and
- a second controller (e.g., the ECU 121 in the embodiment to be described) configured to cause current to flow to the heating unit from the external power supply such that the temperature of the storage battery reaches the lower limit temperature until the designated time, when the temperature of the storage battery is lower than the lower limit temperature before the designated time, and cause current to flow to the heating unit while charging the storage battery with power from the external power supply, after the designated time.

There is further provided (5), based on (4), the power consumption control device, wherein
- when the SOC of the storage battery after the designated time exceeds a predetermined value, the second controller charges the storage battery without causing current to flow through the heating unit using power acquired from the external power supply.

There is further provided (6), based on any one of (1) to (5), the power consumption control device further including:
- a temperature measurement unit configured to measure an ambient temperature of the electric motor vehicle; and
- a third controller (e.g., the ECU 121 in the embodiment to be described) configured to cause current to flow to the heating unit from the external power supply until the temperature of the storage battery reaches a predetermined temperature lower than the target temperature, when the temperature of the storage battery is lower than the target temperature and the ambient temperature is higher than the target temperature.

There is further provided (7), based on any one of (1) to (6), the power consumption control device further including:
- an internal resistance calculation unit (e.g., an internal resistance calculation unit 155 in the embodiment to be described) configured to calculate internal resistance of the storage battery; and
- a fourth controller (e.g., the ECU 121 in the embodiment to be described) configured to correct the target temperature of the storage battery heated by the heating unit to a lower temperature, as the internal resistance increases.

There is further provided (8), based on (7), the power consumption control device, wherein
- the correction amount of the target temperature by the fourth controller is increased as the SOC of the storage battery before being heated by the heating unit is lower.

There is further provided (9), based on any one of (1) to (8), the power consumption control device, wherein
- the power conversion unit is connected to the external power supply.

Advantageous Effects of the Invention

According to (1), when the storage battery is heated to the target temperature such that the effective capacity is changed in a positive direction, the power consumption control device uses the power converted by the power conversion unit to cause current to flow through the heating unit. On the other hand, when the effective capacity is not changed in the positive direction, the power consumption control device uses the power converted by the power conversion unit to charge the storage battery. Thus, since power from the external power supply is consumed by the heating unit only when an improvement of the effective capacity is expected by the heating of the storage battery, the power consumption control device can efficiently consume the power from the external power supply to improve the performance of the storage battery, without consuming the power in inefficient heating.

According to (2), when the storage battery is heated to the target temperature such that the change of the effective capacity is expected to increase by the predetermined amount or more, the power consumption control device causes current to flow to the heating unit. Thus, the power from the external power supply can be efficiently consumed by the heating unit, only when an improvement of the effective capacity is expected by the heating of the storage battery.

According to (3), when the temperature of the storage battery is lower than the lower limit temperature, the power from the external power supply is consumed by the heating unit until the temperature of the storage battery rises to the lower limit temperature, even though the storage battery is heated to the target temperature such that the change of the effective capacity is not expected to increase by the predetermined amount or more. After the temperature of the storage battery reaches the lower limit temperature, the power from the external power supply is consumed to charge the storage battery. Since the temperature of storage battery is raised to the lower limit temperature, the power from the external power supply can be used to improve the effective capacity of the storage battery.

According to (4), when the temperature of the storage battery before the designated time is lower than the lower limit temperature, the temperature of the storage battery is raised to the lower limit temperature until the designated time. When the storage battery is charged after the designated time, the storage battery is heated by the heating unit. However, since the storage battery is also heated by heat generated through the power conversion performed by the power conversion unit when the storage battery is charged, the power consumption control device can reduce power required for heating the storage battery. Furthermore, by setting the lower limit temperature to the lower limit of the temperature at which the storage battery can be charged, the power consumption control device can reduce power required for heating the storage battery until the designated time.

According to (5), when the SOC of the storage battery exceeds the predetermined value, performance improvement of the storage battery by the increase of the SOC exhibits higher efficiency than performance improvement of the storage battery by the heating. Therefore, after the SOC of the storage battery has exceeded the predetermined value, the power consumption control device does not cause current to flow to the heating unit, but only charges the storage battery, which makes it possible to reduce power required for heating the storage battery.

According to (6), when the ambient temperature of the electric motor vehicle is higher than the target temperature of the storage battery, the temperature of the storage battery is highly likely to naturally reach the target temperature without heating the storage battery to the target temperature. Therefore, the storage battery may be heated to a predetermined temperature lower than the target temperature. In this case, compared to when the storage battery is heated to the target temperature, the power consumption control device can reduce power required for heating the storage battery.

According to (7), when the internal resistance of the storage battery increases due to deterioration of the storage battery, the amount of heat generation is increased during charging. Therefore, when charging is performed after a storage battery having high internal resistance has been heated, the temperature of the storage battery is highly likely to rise to a desired temperature during the charging, even though the target temperature is corrected to a low temperature. Therefore, the target temperature of the storage battery may be lowered with the increase of the internal resistance. In this case, compared to when the target temperature is not corrected, the power consumption control device can reduce power required for heating the storage battery.

According to (8), the amount of heat generation increases in accordance with the charging time. Since a long charging time is required as the SOC of the storage battery is lower, the target temperature of the storage battery may be lowered as the SOC is lower. In this case, compared to when the target temperature is not corrected, the power consumption control device can reduce power required for heating the storage battery.

According to (9), the power from the external power supply, converted by the power conversion unit, is not consumed for inefficient heating, but can be efficiently consumed to improve the performance of the storage battery.

MODES FOR CARRYING OUT THE INVENTION

Hereafter, exemplary embodiments of the present invention will be described with reference to the accompanying drawings.

First Embodiment

Figure 1:
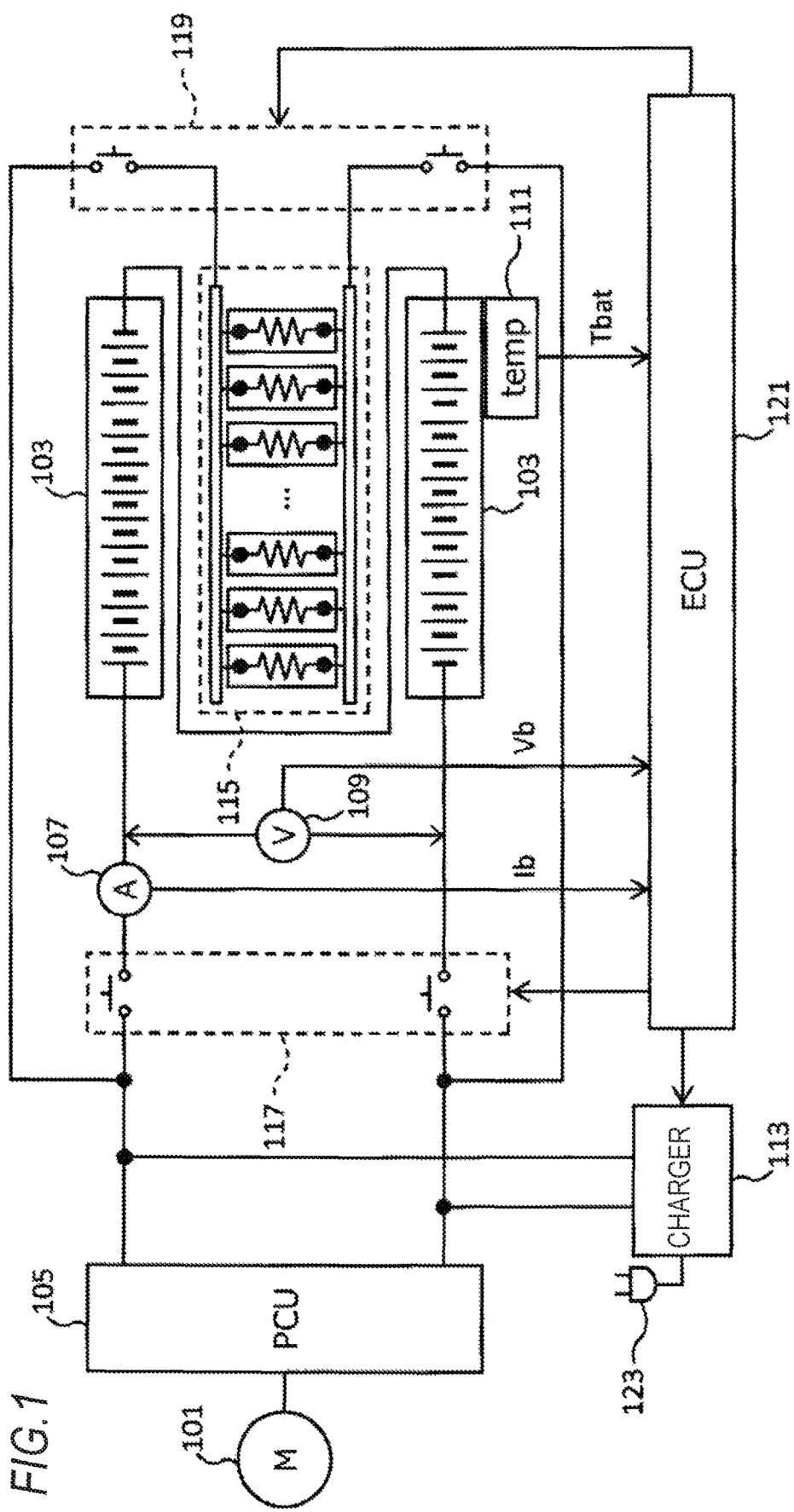
FIG. 1 is a block diagram illustrating a configuration of a power consumption control device according to a first embodiment.

A power consumption control device according to a first embodiment is mounted in a plug-in electric motor vehicle such as an electric vehicle (EV) or hybrid electric motor vehicle (HEV), which includes an electric motor as a driving source, the electric motor being driven with power supplied from a storage battery. FIG. 1 is a block diagram illustrating a configuration of the power consumption control device according to the first embodiment. As illustrated in FIG. 1, the power consumption control device according to the first embodiment includes an electric motor 101, a storage battery 103, a power control unit (PCU) 105, a current sensor 107, a voltage sensor 109, a temperature sensor 111, a charger 113, a heater 115, switch units 117 and 119 and an electrical control unit (ECU) 121.

The electric motor 101 is a driving source which generates power to drive the electric motor vehicle.

The storage battery 103 has a plurality of storage cells such as lithium-ion battery cells or nickel-hydrogen battery cells, and supplies high-voltage power to the electric motor 101. Furthermore, when the storage battery 103 which is a secondary battery is used, the state of charge (SOC) of the storage battery 103 needs to be monitored at all times, in order to prevent overcharge or over-discharge. After such control has been performed, the storage battery 103 is repeatedly charged and discharged within a range of SOC in which the storage battery 103 is available (0% to 100%). The SOC of the storage battery 103 is derived based on an integrated value of charge/discharge currents of the storage battery 103 and/or an open circuit voltage (OCV) of the storage battery 103.

The PCU 105 converts DC power from the storage battery 103 into AC power. Furthermore, the PCU 105 may directly raise or lower a DC output voltage of the storage battery 103, and then convert the raised or lowered DC output voltage into an AC voltage.

The current sensor 107 detects a charge/discharge current of the storage battery 103. A signal indicating the current value detected by current sensor 107 is sent to the ECU 121. The voltage sensor 109 detects a terminal voltage of the storage battery 103, which is also referred to as a closed circuit voltage (CCV). A signal indicating the voltage value detected by the voltage sensor 109 is sent to the ECU 121. The temperature sensor 111 detects the temperature of the storage battery 103. A signal indicating the temperature of the storage battery 103, detected by the temperature sensor 111, is sent to the ECU 121.

The charger 113 converts AC power supplied from an external power supply (not illustrated) into DC power, with a plug 123 connected to the external power supply. The DC power converted by the charger 113 is supplied to at least one of the storage battery 103 and the heater 115.

The heater 115 generates heat when a current from the storage battery 103 or a current obtained through the charger 113 from the external power supply (not illustrated) is carried to the heater 115, and raises the temperature of the storage battery 103 using the generated heat.

The switch unit 117 opens/closes a current path from the charger 113 to the storage battery 103. The switch unit 119 opens/closes a current path from the storage battery 103 or the charger 113 to the heater 115. The switch units 117 and 119 are opened/closed by control of the ECU 121.

The ECU 121 performs control related to the heating of the storage battery 103 using the heater 115, while the electric motor vehicle is parked. In the present embodiment, the ECU 121 performs the corresponding control when the plug 123 is connected to the external power supply.

First Example

Figure 2:
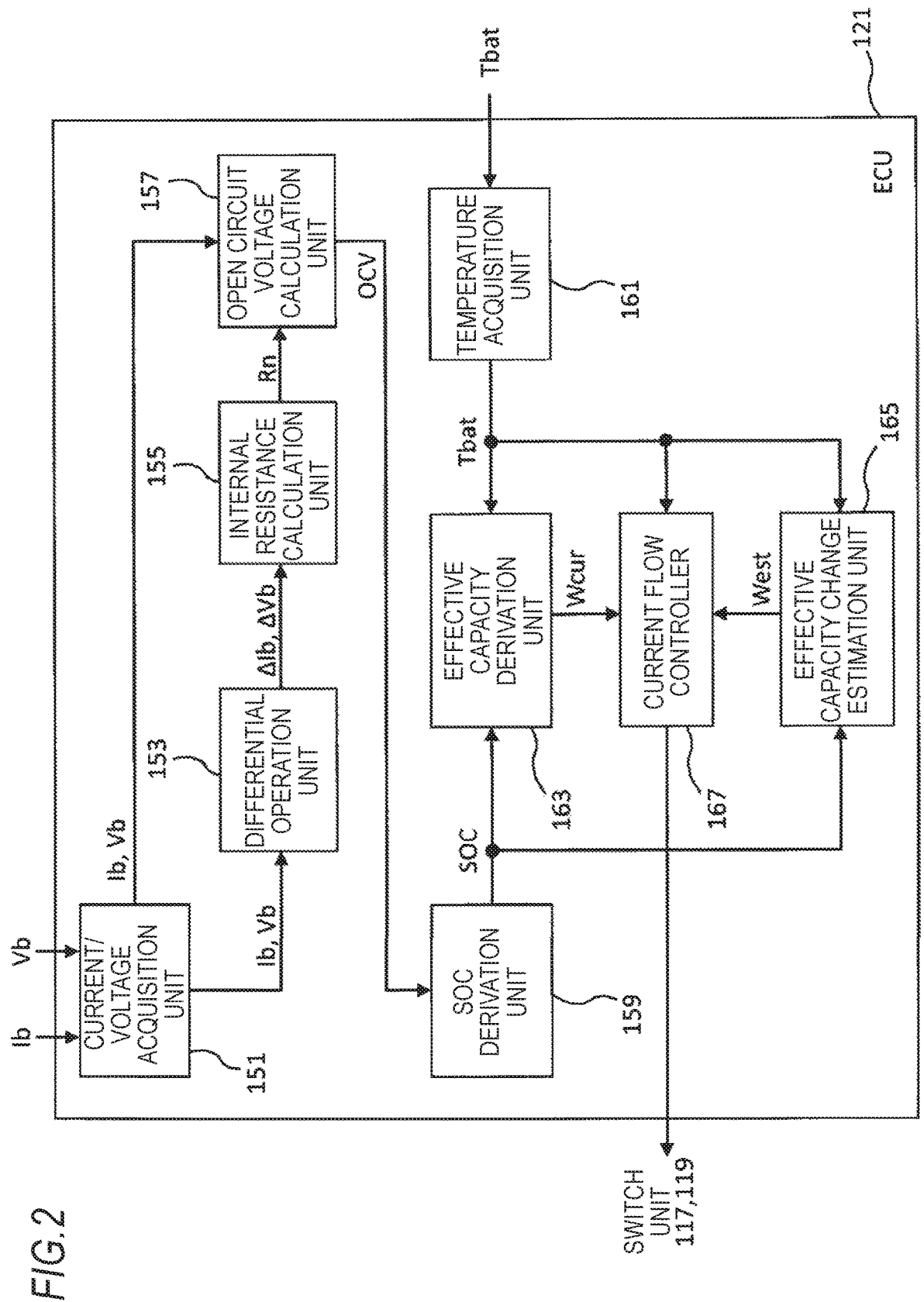
FIG. 2 is a block diagram illustrating an internal configuration of an electric control unit (ECU) in a first example of the first embodiment.

FIG. 2 is a block diagram illustrating an internal configuration of the ECU 121 in a first example of the first embodiment. As illustrated in FIG. 2, the ECU 121 includes a current/voltage acquisition unit 151, a differential operation unit 153, an internal resistance calculation unit 155, an open circuit voltage calculation unit 157, an SOC derivation unit 159, a temperature acquisition unit 161, an effective capacity derivation unit 163, an effective capacity change estimation unit 165 and a current flow controller 167.

The current/voltage acquisition unit 151 acquires a charge/discharge current Ib detected by the current sensor 107 and a terminal voltage Vb detected by the voltage sensor 109. The differential operation unit 153 performs a differential operation on the charge/discharge current Ib and the terminal voltage Vb acquired by the current/voltage acquisition unit 151. The internal resistance calculation unit 155 calculates an internal resistance Rn of the storage battery 103 according to Equation 1 below, based on the differential value ΔIb of the charge/discharge current Ib and the differential value ΔVb of the terminal voltage Vb, which are calculated by the differential operation unit 153.

$$Rn = \Delta Vb / \Delta Ib \quad (1)$$

The open circuit voltage calculation unit 157 calculates an open circuit voltage OCV of the storage battery 103 according to Equation 2 below, based on the internal resistance Rn calculated by the internal resistance calculation unit 155 and the charge/discharge current Ib and the terminal voltage Vb acquired by the current/voltage acquisition unit 151.

$$OCV = Vb + Ib \times Rn \quad (2)$$

The SOC derivation unit 159 derives a SOC of the storage battery 103 from the open circuit voltage OCV calculated by the open circuit voltage calculation unit 157, using a map. The temperature acquisition unit 161 acquires a temperature Tbat of the storage battery 103, detected by the temperature sensor 111. The effective capacity derivation unit 163 derives the current effective capacity Wcur of the storage battery 103, according to the SOC of the storage battery 103, derived by the SOC derivation unit 159, and the temperature Tbat of the storage battery 103, acquired by the temperature acquisition unit 161. In order to derive the effective capacity Wcur, the effective capacity derivation unit 163 uses a map based on a graph indicating an effective capacity corresponding to the temperature and SOC of the storage battery 103 in FIG. 3.

The effective capacity change estimation unit 165 estimates an effective capacity West of the storage battery 103 when the heater 115 generates heat through current flowing due to power supplied from an external power supply and heats the storage battery 103 to a target temperature. When estimating the effective capacity West, the effective capacity change estimation unit 165 also uses the map based on the graph indicating an effective capacity corresponding to the temperature and SOC of the storage battery 103 in FIG. 3. At this time, the target temperature is used as the temperature of the storage battery 103, and the SOC derived by the SOC derivation unit 159 is used as the SOC of the storage battery 103.

When a change from the current effective capacity Wcur of the storage battery 103, derived by the effective capacity derivation unit 163, to the effective capacity West of the storage battery 103, estimated by the effective capacity change estimation unit 165, (=effective capacity West−effective capacity Wcur) indicates increases by a predetermined amount or more, the current flow controller 167 closes the switch unit 119 and opens the switch unit 117 until the temperature Tbat of the storage battery 103 reaches the target temperature, in order to cause current to flow through the heater 115 using power supplied from the external power supply through the charger 113. On the other hand, when the change of the effective capacity increases by less than the predetermined amount, the current flow controller 167 does not change the open/close states of the switch units 117 and 119.

Figure 3:
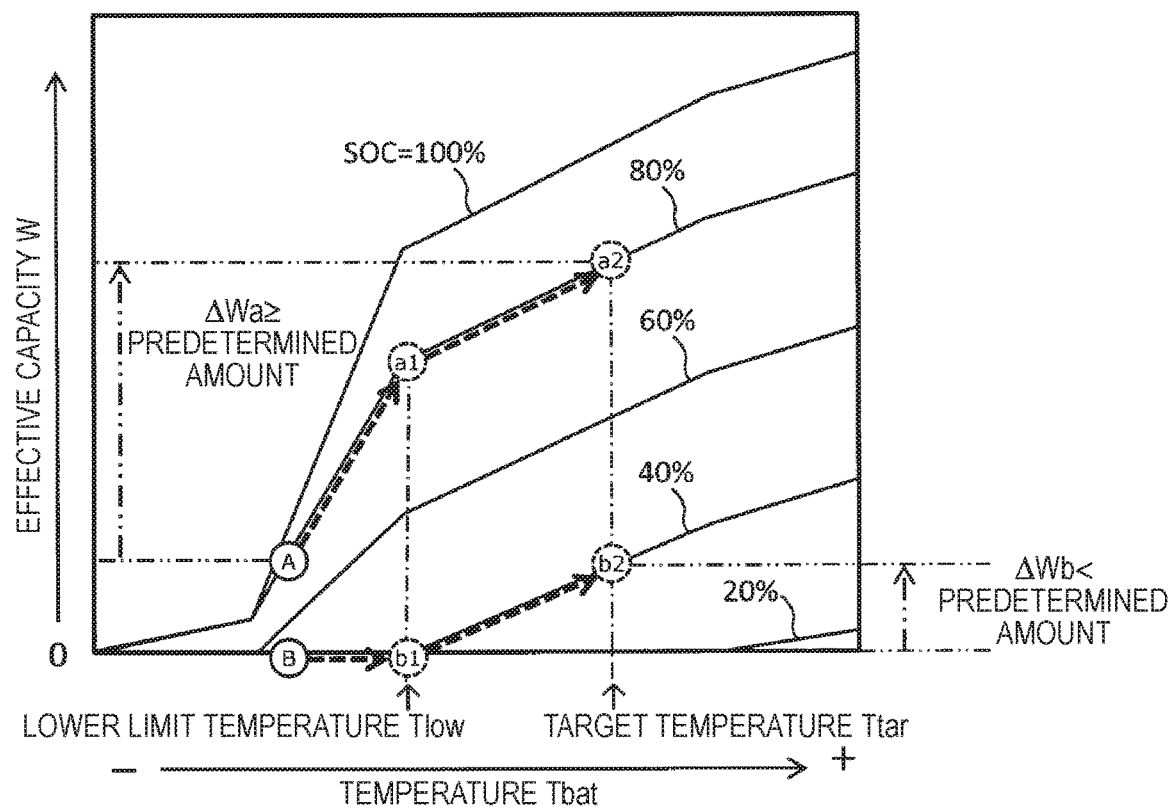
FIG. 3 is a graph illustrating an effective capacity corresponding to the temperature and SOC of a storage battery.

According to the heating control of the storage battery 103 using the heater 115 through the ECU 121 in the present example while the electric motor vehicle is parked with the plug 123 connected to the external power supply, a change ΔWa of the effective capacity is expected to increase by the predetermined amount or more, when the storage battery 130 at a temperature and SOC indicated by "A" in FIG. 3 is heated to the target temperature Ttar. Therefore, the current flow controller 167 closes the switch unit 119 and the opens the switch unit 117, in order to cause current to flow through the heater 115 using power supplied from the external power supply. On the other hand, when a change ΔWb of the effective capacity is not expected to increase by the predetermined amount or more if the storage battery 130 at a temperature and SOC indicated by "B" in FIG. 3 is heated to the target temperature Ttar, the current flow controller 167 closes the switch unit 119 and opens the switch unit 117 to cause current to flow through the heater 115 using power supplied from the external power supply until the temperature Tbat of the storage battery 103 reaches the lower limit temperature Tlow, in the case where the temperature Tbat of the storage battery 103 is lower than the lower limit temperature Tlow. After the temperature Tbat of the storage battery 103 reaches the lower limit temperature Tlow, the current flow controller 167 opens the switch unit 119 and closes the switch unit 117, in order to charge the storage battery 103 with power supplied from the external power supply. The lower limit temperature Tlow corresponds to the lowest temperature at which an increase of the effective capacity of the storage battery 103 is expected to some degree by the charging of the storage battery 103.

According to the present example, when the storage battery 103 is heated to the target temperature Ttar such that the change of the effective capacity is expected to increase by the predetermined amount or more, power from the external power supply is used to cause current to flow through the heater 115. On the other hand, when the change of the effective capacity is not expected to increase by the predetermined amount or more, power from the external power supply is used to charge the storage battery 103. As such, since the power from the external power supply is consumed by the heater 115 only when the increase of the effective capacity is expected by the heating of the storage battery 103, the power from the external power supply is not consumed for inefficient heating, but can be efficiently consumed to improve the performance of the storage battery 103. However, even when the change of the effective capacity is not expected to increase by the predetermined amount or more even though the storage battery 103 is heated to the target temperature Ttar because the temperature Tbat of the storage battery 103 is lower than the lower limit temperature Tlow, the heater 115 is operated with the power from the external power supply until the temperature Tbat of the storage battery 103 rises to the lower limit temperature Tlow. After the temperature Tbat of the storage battery 103 reaches the lower limit temperature Tlow, the power from the external power supply is used to charge the storage battery 103. As such, since the temperature Tbat of the storage battery 103 is raised to the lower limit temperature Tlow or more, the power from the external power supply can be used to improve the effective capacity of the storage battery.

Second Example

Figure 4:
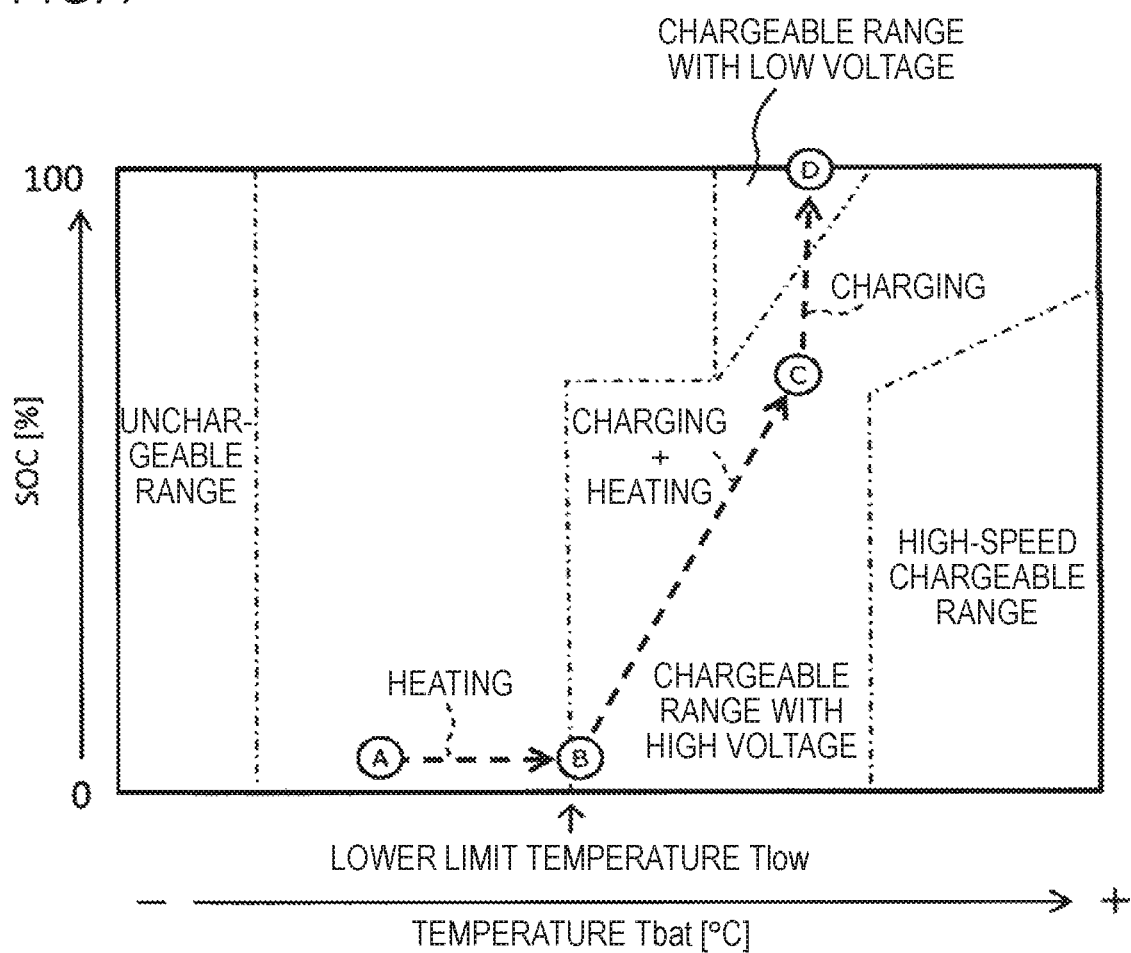
FIG. 4 illustrates control related to heating and charging of a storage battery according to a second example of the first embodiment.

FIG. 4 illustrates control related to heating and charging of the storage battery 103 according to a second example of the first embodiment. In the example illustrated in FIG. 4, the time at which the charging of the storage battery 103 is started (charging start time) is set in the ECU 121 in advance, and the ECU 121 controls the charger 113 to start charging the storage battery 103 with power supplied from the external power supply at the set time. In the present example, when the temperature Tbat of the storage battery 103 before the charging start time is lower than a lower limit temperature Tlow indicated by "A" in FIG. 4, the ECU 121 closes the switch unit 119 and opens the switch unit 117, in order to cause current to flow through the heater 115 using power supplied from the external power supply. The lower limit temperature Tlow corresponds to the lowest temperature at which charging can be performed at a high voltage while the SOC of the storage battery 103 is low. When the temperature Tbat of the storage battery 103 is raised to the lower limit temperature Tlow through the heating of the heater 115 and set in a state indicated by "B" in FIG. 4, the ECU 121 maintains this state.

When the charging start time comes, the ECU 121 closes both of the switch units 119 and 117 in order to charge the storage battery 103 while causing current to flow through the heater 115 using power supplied from the external power supply. At this time, since the temperature Tbat of the storage battery 103 is raised to the lower limit temperature Tlow, the storage battery 103 is charged with a high voltage. Then, when the SOC of the storage battery 103 exceeds a predetermined value, the ECU 121 opens the switch unit 119 to stop causing current to flow through the heater 115, and continuously charges the storage battery 103.

According to the present example, when the temperature Tbat of the storage battery 103 before the charging start time is lower than the lower limit temperature Tlow, the temperature of the storage battery 103 is raised to the lower limit temperature Tlow or more until the charging start time. Then, when the storage battery 103 is charged after the charging start time, the storage battery 103 is heated by the heater 115. However, since the storage battery 103 is also heated by heat generated through the power conversion performed by the charger 113 when the storage battery 103 is charged, the power required for heating the storage battery 103 can be reduced. Moreover, since the lower limit temperature Tlow is set to the lower limit of the temperature at which the storage battery 103 can be charged with a high voltage, it is possible to reduce the power required for heating the storage battery 130 until the charging start time. Furthermore, when the SOC of the storage battery 103 exceeds a predetermined value, the performance improvement by the increase of the SOC has higher efficiency than the performance improvement of the storage battery 103 by the heating. Therefore, after the SOC of the storage battery 103 has exceeded the predetermined value, only the charging of the storage battery 103 is performed without causing current to flow through the heater 115, which makes it possible to reduce the power required for heating the storage battery 103.

Third Example

Figure 5:
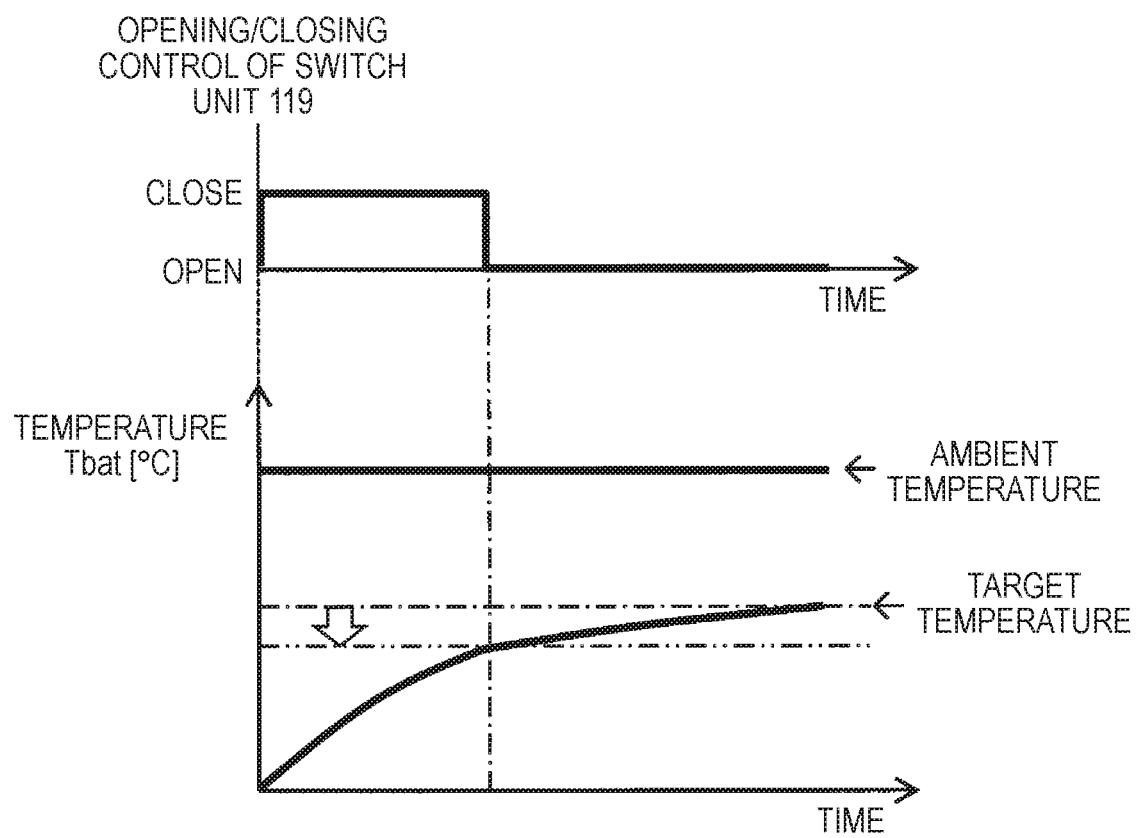
FIG. 5 illustrates heating control of a storage battery according to a third example of the first embodiment.

FIG. 5 illustrates heating control of the storage battery 103 according to a third example of the first embodiment. The example illustrated in FIG. 5 is based on the supposition that an electric motor vehicle arrives at a garage at room temperature after traveling in the middle of winter, and is parked in the garage with the plug 123 connected to the external power supply. The electric motor vehicle has a temperature sensor (not illustrated) for measuring the ambient temperature of the electric motor vehicle.

When the plug 123 is connected to the external power supply, the temperature Tbat of the storage battery 103 is low in the electric motor vehicle which has just finished traveling. Therefore, the ECU 121 closes the switch unit 119 to cause current to flow through the heater 115 using power supplied from the external power supply. At this time, when the ambient temperature of the electric motor vehicle is higher than the target temperature of the storage battery 103, the ECU 121 causes current to flow to the heater 115 from the external power supply until the temperature Tbat of the storage battery 103 reaches a predetermined temperature lower than the target temperature.

According to the present example, when the ambient temperature of the electric motor vehicle is higher the target temperature of the storage battery 103, the temperature of the storage battery 103 is highly likely to naturally reach the target temperature, even though the storage battery 103 is not heated to the target temperature. Therefore, the storage battery 103 may be heated to the predetermined temperature lower than the target temperature. In this case, compared to when the storage battery 103 is heated to the target temperature, power required for heating the storage battery 103 can be reduced.

Fourth Example

Figure 6:
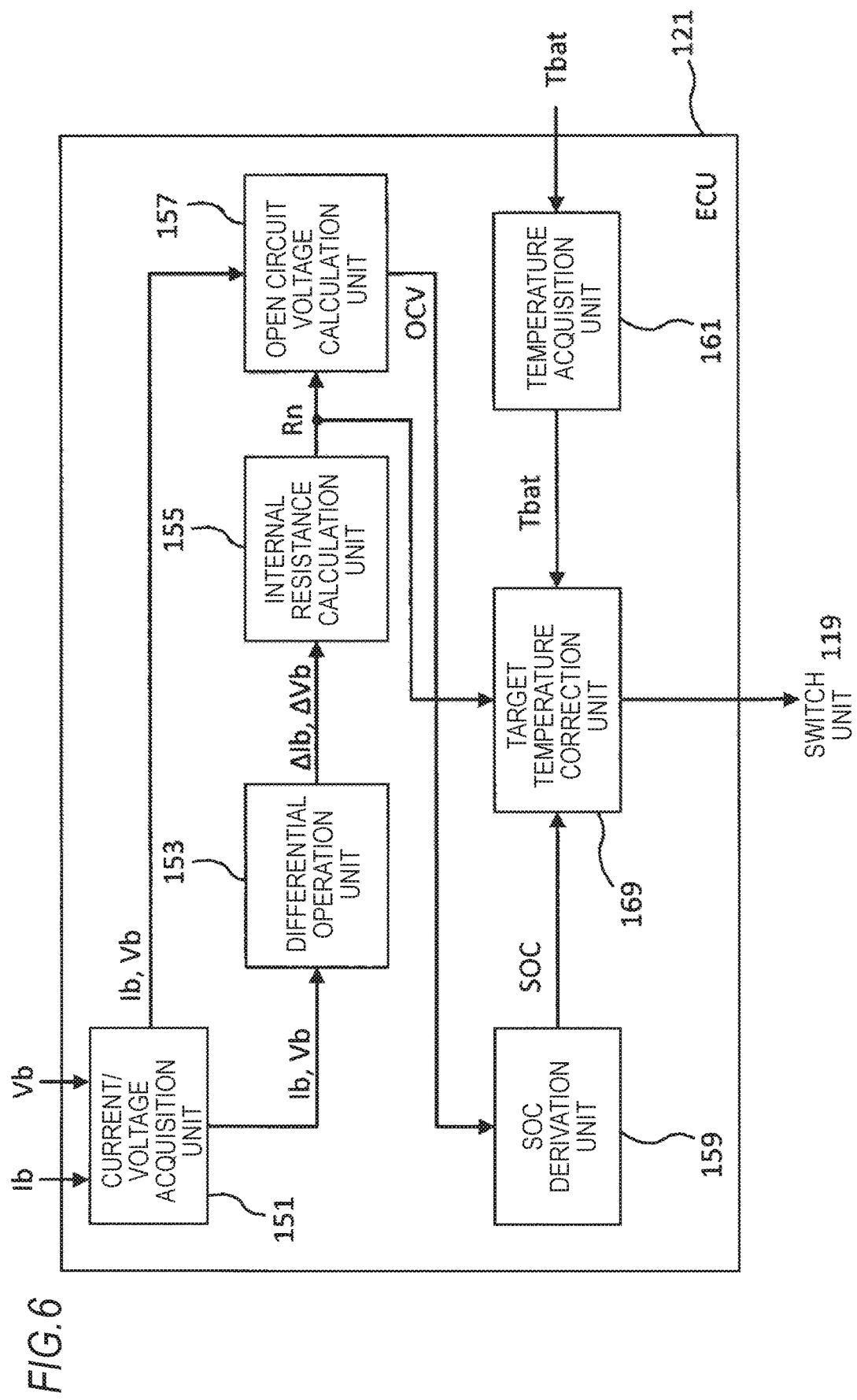
FIG. 6 is a block diagram illustrating an internal configuration of an ECU in a fourth example of the first embodiment.

FIG. 6 is a block diagram illustrating an internal configuration of the ECU 121 in a fourth example of the first embodiment. As illustrated in FIG. 6, the ECU 121 includes a current/voltage acquisition unit 151, a differential operation unit 153, an internal resistance calculation unit 155, an open circuit voltage calculation unit 157, a SOC derivation unit 159, a temperature acquisition unit 161 and a target temperature correction unit 169.

The current/voltage acquisition unit 151 acquires a charge/discharge current Ib detected by the current sensor 107 and a terminal voltage Vb detected by the voltage sensor 109. The differential operation unit 153 performs a differential operation on the charge/discharge current Ib and the terminal voltage Vb which are acquired by the current/voltage acquisition unit 153. The internal resistance calculation unit 155 calculates an internal resistance Rn of the storage battery 103 according to Equation 3 below, based on the differential value ΔIb of the charge/discharge current Ib and the differential value ΔVb of the terminal voltage Vb, which are calculated by the differential operation unit 153.

$$Rn = \Delta Vb / \Delta Ib \quad (3)$$

The open circuit voltage calculation unit 157 calculates the OCV of the storage battery 103 in accordance with Equation 4 below, based on the internal resistance Rn calculated by the internal resistance calculation unit 155 and the charge/discharge current Ib and the terminal voltage Vb acquired by the current/voltage acquisition unit 151.

$$OCV = Vb + Ib \times Rn \quad (4)$$

The SOC derivation unit 159 derives the SOC of the storage battery 103 from the open circuit voltage OCV calculated by the open circuit voltage calculation unit 157, using a map. The target temperature correction unit 169 corrects the preset target temperature of the storage battery 103, based on the internal resistance Rn and SOC of the storage battery 103.

Figure 7:
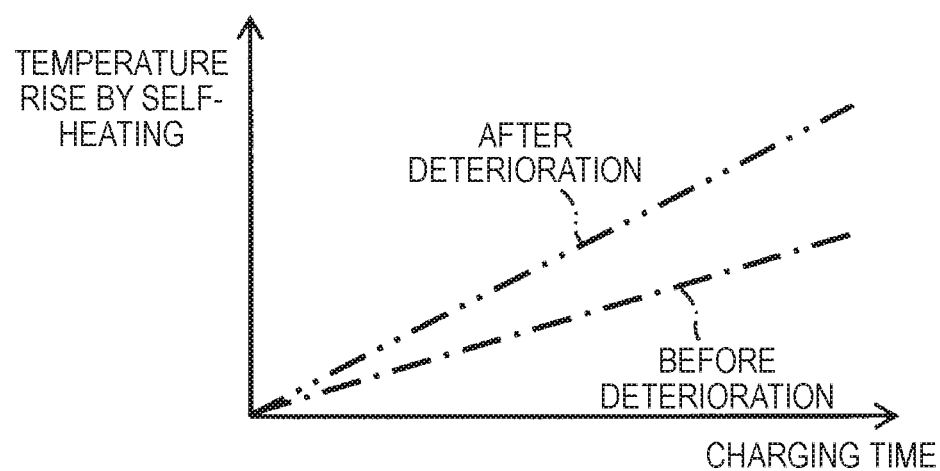
FIG. 7 is a graph illustrating a difference in temperature increase by self-heating during charging between before and after deterioration of the storage battery.
Figure 8:
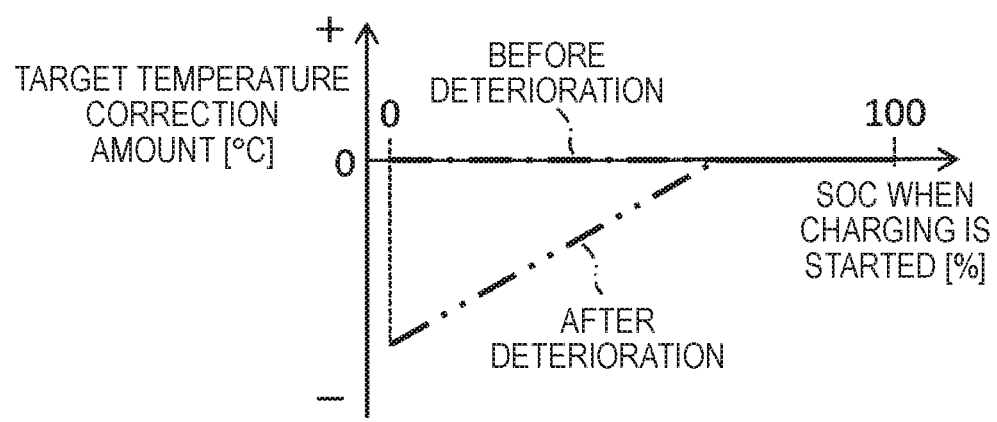
FIG. 8 is a graph illustrating a difference in correction amount of a target temperature between before and after deterioration of the storage battery, according to the SOC of the storage battery when charging is started.

FIG. 7 is a graph illustrating a difference in temperature increase by self-heating during charging between before and after deterioration of the storage battery 103. FIG. 8 is a graph illustrating a difference in correction amount of the target temperature between before and after the deterioration of the storage battery 103, according to the SOC of the storage battery 103 when charging is started. The internal resistance of the storage battery 103 is changed according to the degree of deterioration. The internal resistance of the storage battery 103 is low before deterioration, but increases as the deterioration progresses. When the storage battery 103 is charged, the temperature Tbat of the storage battery 103 rises due to self-heating, as the charging time is lengthened. However, since the progress of the deterioration increases the amount of heat generation during charging, the temperature rise increases as illustrated in FIG. 7.

Therefore, when a predetermined charging time or more is expected to be required because the SOC of the storage battery 103 when charging is started is lower than the predetermined value as illustrated in FIG. 8, the target temperature correction unit 169 according to the present example corrects the target temperature to a low temperature, as the deterioration degree corresponding to the internal resistance of the storage battery 103 increases. The lower the SOC when charging is started, the larger the correction amount is made.

According to the present example, when charging is performed after the storage battery 103 having large internal resistance is heated, the temperature of the storage battery 103 is highly likely to rise to a desired temperature during charging, even though the target temperature is corrected to low temperature. Therefore, the target temperature of the storage battery 103 may be lowered with the increases of the internal resistance. In this case, compared to when the target temperature is not corrected, the power required for heating the storage battery 103 can be reduced. Furthermore, the lower the SOC of the storage battery 103, the longer the charging time is required. Therefore, the target temperature of the storage battery 103 may be lowered with the decrease of the SOC. In this case, compared to when the target temperature is not corrected, the power required for heating the storage battery 103 can be reduced.

Second Embodiment

Figure 9:
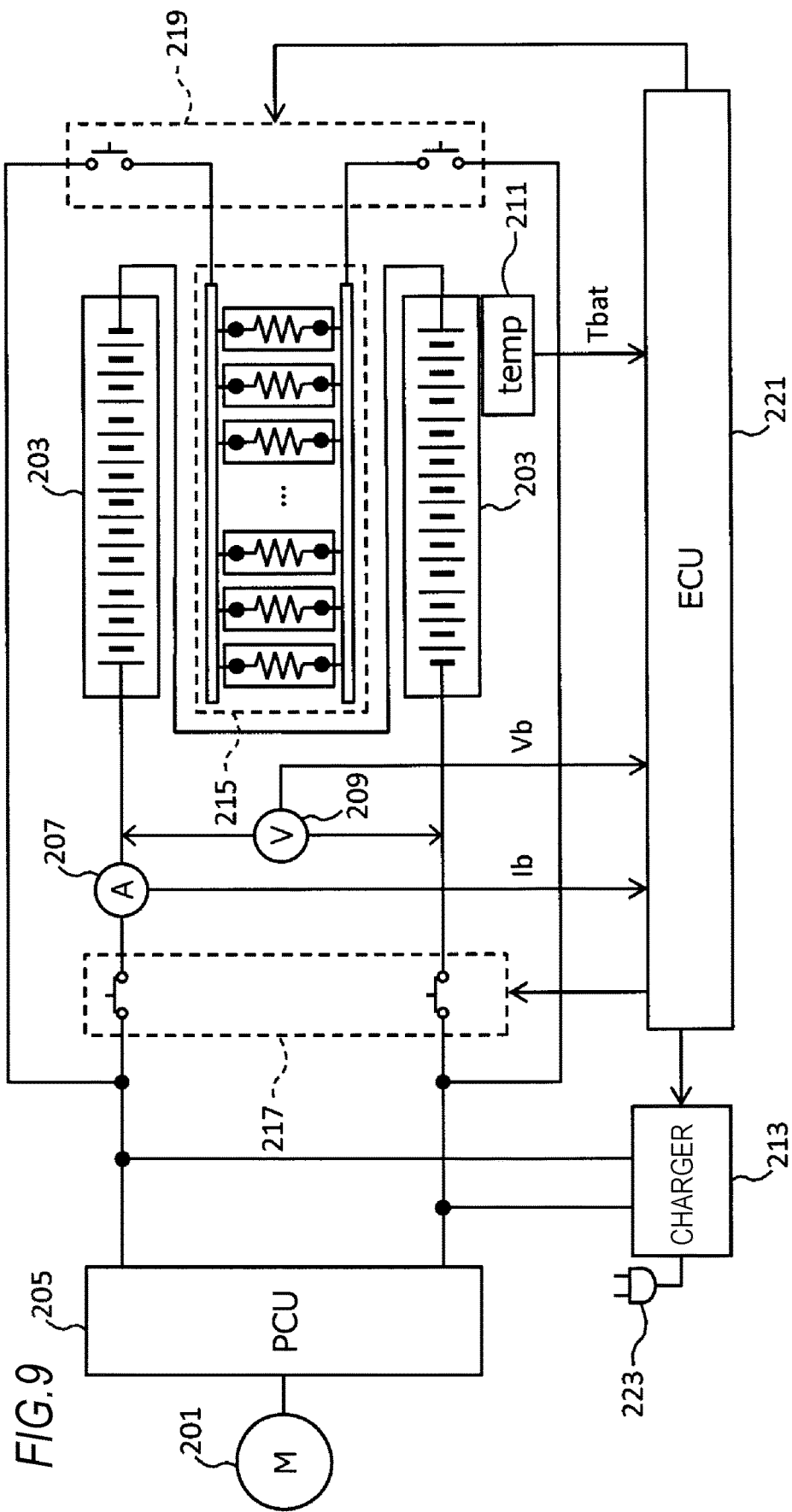
FIG. 9 is a block diagram illustrating a configuration of a heating control device according to a second embodiment.

A heating control device according to a second embodiment is mounted in a plug-in electric motor vehicle such as an EV or HEV, which includes an electric motor as a driving source, the electric motor being driven with power supplied from a storage battery. FIG. 9 is a block diagram illustrating a configuration of the heating control device according to the second embodiment. As illustrated in FIG. 9, the heating control device according to the second embodiment includes an electric motor 201, a storage battery 203, a power control unit (PCU) 205, a current sensor 207, a voltage sensor 209, a temperature sensor 211, a charger 213, a heater 215, switch units 217 and 219 and an ECU 221.

The electric motor 201 is a driving source which generates power to drive the electric motor vehicle.

The storage battery 203 has a plurality of storage cells such as lithium-ion battery cells or nickel-hydrogen battery cells, and supplies high-voltage power to the electric motor 201. Furthermore, when the storage battery 203 which is a secondary battery is used, the SOC of the storage battery 203 needs to be monitored at all times, in order to prevent overcharge or over-discharge. After such control has been performed, the storage battery 203 is repeatedly charged and discharged within a range of SOC in which the storage battery 203 is available (0% to 100%). The SOC of the storage battery 203 is derived based on an integrated value of charge/discharge currents of the storage battery 203 and/or an OCV of the storage battery 203.

The PCU 205 converts DC power from the storage battery 203 into AC power. Furthermore, the PCU 205 may directly raise or lower a DC output voltage of the storage battery 203, and then convert the raised or lowered DC output voltage into an AC voltage.

The current sensor 207 detects a charge/discharge current of the storage battery 203. A signal indicating the current value detected by current sensor 207 is sent to the ECU 221. The voltage sensor 209 detects a terminal voltage of the storage battery 203, which is also referred to as an open circuit voltage (CCV). A signal indicating the voltage value detected by the voltage sensor 209 is sent to the ECU 221. The temperature sensor 211 detects the temperature of the storage battery 203. A signal indicating the temperature of the storage battery 203, detected by the temperature sensor 211, is sent to the ECU 221.

The charger 213 converts AC power supplied from an external power supply (not illustrated) into DC power, with a plug 223 connected to the external power supply. The DC power converted by the charger 213 is supplied to at least any one of the storage battery 203 and the heater 215.

The heater 215 generates heat when a current from the storage battery 103 or a current obtained through the charger 213 from the external power supply (not illustrated) is carried to the heater 215, and heats the storage battery 203 using the generated heat.

The switch unit 217 opens/closes a current path from the charger 213 to the storage battery 203. Furthermore, the switch unit 219 opens/closes a current path from the storage battery 203 or the charger 213 to the heater 215. The switch units 217 and 219 are opened/closed by control of the ECU 221.

The ECU 221 performs control related to the heating of the storage battery 203 using the heater 215, while the electric motor vehicle is parked. In the present embodiment, the ECU 221 performs the corresponding control while the plug 223 is not connected to the external power supply.

First Example

Figure 10:
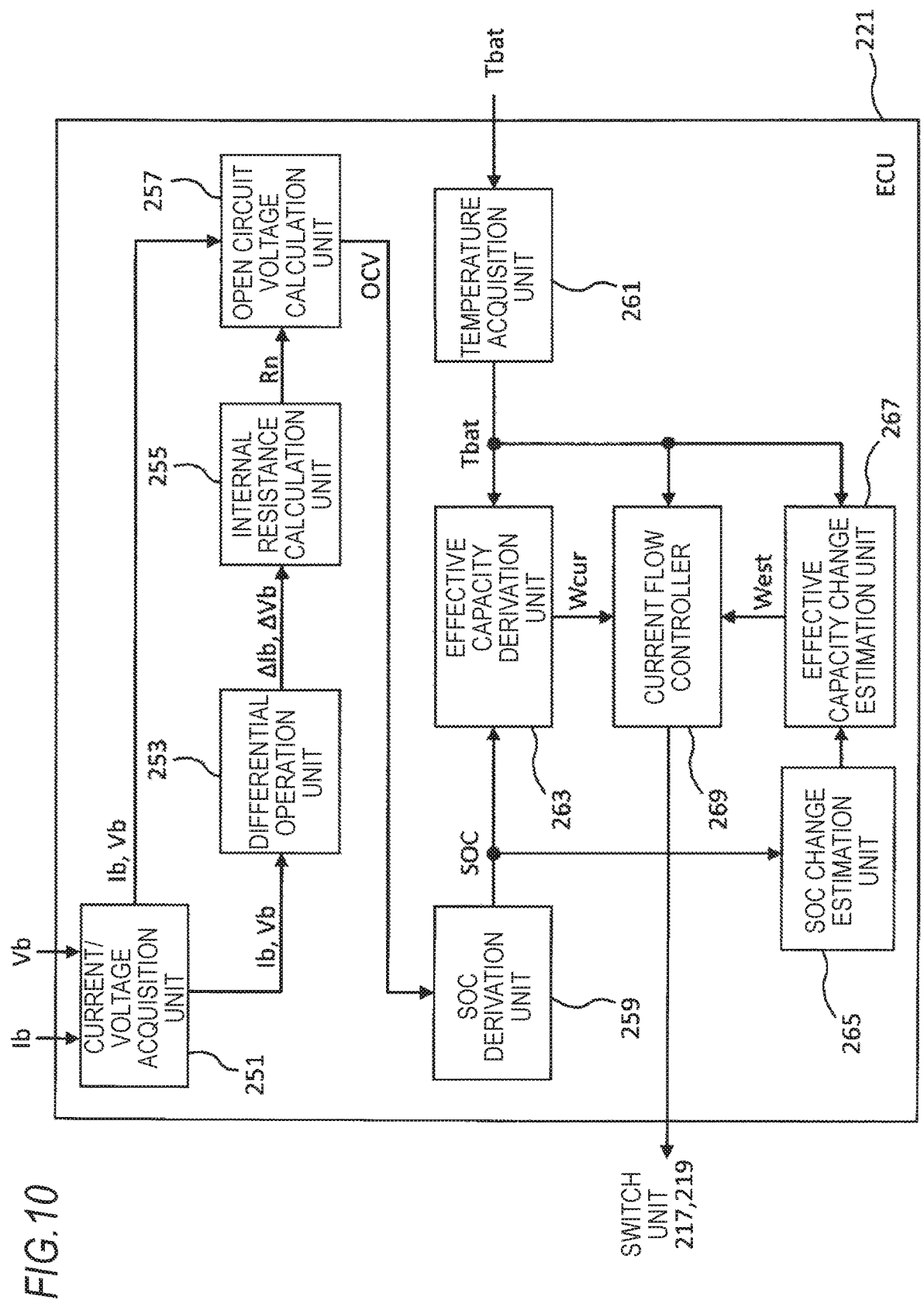
FIG. 10 is a block diagram illustrating an internal configuration of an ECU in a first example of the second embodiment.

FIG. 10 is a block diagram illustrating an internal configuration of the ECU 221 in a first example of the second embodiment. As illustrated in FIG. 10, the ECU 221 includes a current/voltage acquisition unit 251, a differential operation unit 253, an internal resistance calculation unit 255, an open circuit voltage calculation unit 257, an SOC derivation unit 259, a temperature acquisition unit 261, an effective capacity derivation unit 263, an SOC change estimation unit 265, an effective capacity change estimation unit 267 and a current flow controller 269.

The current/voltage acquisition unit 251 acquires the charge/discharge current Ib detected by the current sensor 207 and the terminal voltage Vb detected by the voltage sensor 209. The differential operation unit 253 performs a differential operation on the charge/discharge current Ib and the terminal voltage Vb acquired by the current/voltage acquisition unit 251. The internal resistance calculation unit 255 derives an internal resistance Rn of the storage battery 203 according to Equation 5 below, based on the differential value ΔIb of the charge/discharge current Ib and the differential value ΔVb of the terminal voltage Vb, which are calculated by the differential operation unit 253.

$$Rn = \Delta Vb/\Delta Ib \qquad (5)$$

The open circuit voltage calculation unit 257 calculates an open circuit voltage OCV of the storage battery 203 according to Equation 6 below, based on the internal resistance Rn calculated by the internal resistance calculation unit 255 and the charge/discharge current Ib and the terminal voltage Vb acquired by the current/voltage acquisition unit 251.

$$OCV = Vb + Ib \times Rn \qquad (6)$$

The SOC derivation unit 259 derives the SOC of the storage battery 203 from the open circuit voltage OCV calculated by the open circuit voltage calculation unit 257, using a map. The temperature acquisition unit 261 acquires a temperature Tbat of the storage battery 203, detected by the temperature sensor 211. The effective capacity derivation unit 263 derives the current effective capacity Wcur of the storage battery 203, according to the SOC of the storage battery 203, derived by the SOC derivation unit 259, and the temperature Tbat of the storage battery 203 acquired by the temperature acquisition unit 261. When deriving the effective capacity Wcur, the effective capacity derivation unit 263 uses a map based on a graph indicating an effective capacity corresponding to the temperature and SOC of the storage battery 203 in FIG. 11.

The SOC change estimation unit 265 estimates a change in SOC of the storage battery 203 when current flows through the heater 215 due to power supplied from the storage battery 203 in order to raise the temperature of the storage battery 203 to the target temperature. The SOC change is estimated according to the amount of power consumed by the heater 215.

The effective capacity change estimation unit 267 estimates an effective capacity West of the storage battery 203, when the heater 215 generates heat through power supplied from the storage battery 203 and heats the storage battery 203 to the target temperature. When estimating the effective capacity West, the effective capacity change estimation unit 267 also uses the map based on the graph indicating the effective capacity corresponding to the temperature and SOC of the storage battery 103 in FIG. 11. At this time, the target temperature is used as the temperature of the storage battery 203, and a SOC after heating, estimated by the SOC change estimation unit 265, is used as the SOC of the storage battery 203.

When a change from the current effective capacity Wcur of the storage battery 203, derived by the effective capacity derivation unit 263, to the effective capacity West of the storage battery 203, estimated by the effective capacity change estimation unit 267, (=effective capacity West−effective capacity Wcur) increases by a predetermined amount or more, the current flow controller 269 closes the switch units 217 and 219 until the temperature Tbat of the storage battery 203 reaches the target temperature, in order to cause current to flow through the heater 215 using power supplied from the storage battery 203. On the other hand, when the change of the effective capacity increases by less than the predetermined amount, the current flow controller 269 does not change the open/close states of the switch units 217 and 219.

Figure 11:
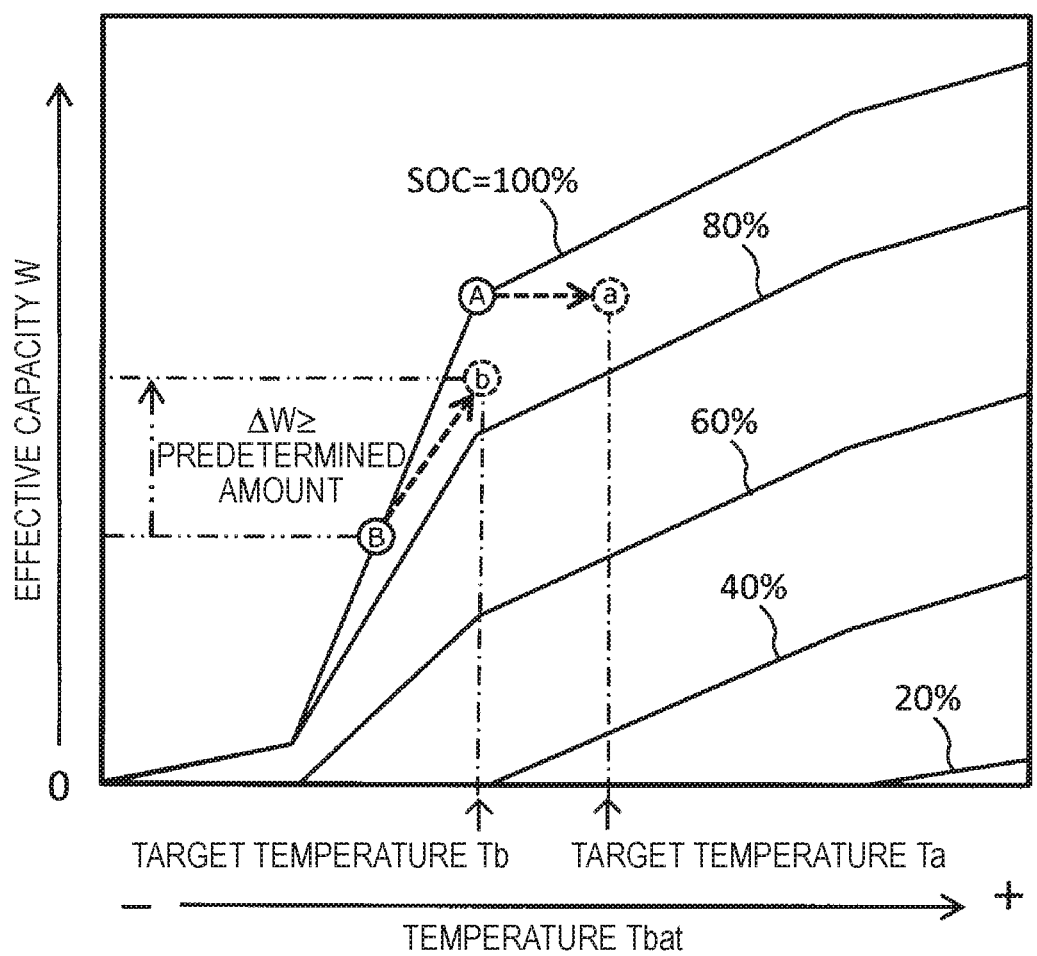
FIG. 11 is a graph illustrating an effective capacity corresponding to the temperature and SOC of a storage battery.

According to the heating control of the storage battery 203 using the heater 215 through the ECU 221 in the present example when the electric motor vehicle is parked while the plug 223 is not connected to the external power supply, the effective capacity is not changed even though the temperature of the storage battery 203 at a temperature and SCO indicated by "A" in FIG. 11 is raised to the target temperature Ta. Therefore, the current flow controller 269 does not change the open/close states of the switch units 217 and 219. On the other hand, when the temperature of the storage battery 203 at a temperature and SOC indicated by "B" in FIG. 11 is raised to the target temperature Tb, a change ΔW of the effective capacity is expected to increase by a predetermined amount or more. Therefore, the current flow controller 269 closes the switch units 217 and 219 to cause current to flow through the heater 215 using power supplied from the storage battery 203.

According to the present example, only when the power of the storage battery 203 is consumed to raise the temperature of the storage battery 203 such that the change of the effective capacity of the storage battery 203 is expected to increase by a predetermined amount or more, electricity is conducted to the heater 215 from the storage battery 203. Therefore, the power stored in the storage battery 203 can be efficiently consumed to improve the performance of the storage battery 203.

Second Example

Figure 12:
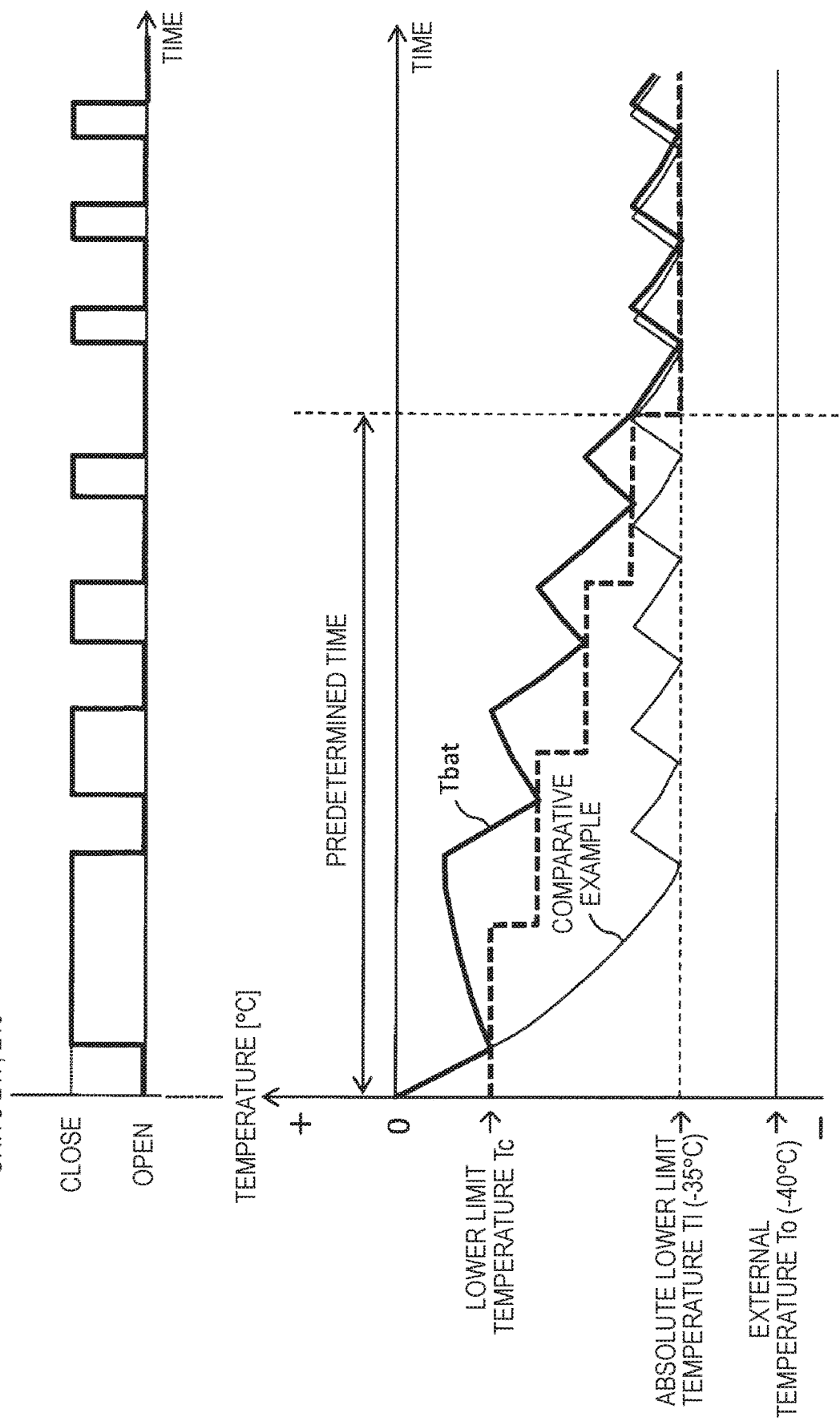
FIG. 12 illustrates control related to heating of the storage battery using a heater according to a second example of the second embodiment.

FIG. 12 illustrates control related to heating of the storage battery 203 using the heater 215 according to a second example of the second embodiment. The example illustrated in FIG. 12 is based on the supposition that the electric motor vehicle is continuously parked under an extremely low-temperature environment while the plug 223 is not connected to the external power supply, after the electric motor vehicle has traveled under the extremely low-temperature environment. Although the temperature Tbat of the storage battery 203 in the electric motor vehicle which has just finished traveling is, for example, 0° C., the external temperature To may be an extremely low temperature which is much lower than 0° C., for example, −40° C. Therefore, the temperature Tbat of the storage battery 203 falls. However, when the storage battery 203 falls to the external temperature To, the output of the storage battery 203 is significantly reduced to such a level at which the electric motor vehicle cannot operate. Therefore, the storage battery 203 needs to be maintained at a higher temperature than an absolute lower limit temperature T1 (for example, −35° C.) higher than the external temperature To.

Therefore, when the temperature Tbat of the storage battery 203, detected by the temperature sensor 211, falls to the absolute lower limit temperature T1 as illustrated in a "comparative example" of FIG. 12, the ECU 221 closes the switch units 217 and 219, and causes current to flow through the heater 215 using power supplied from the storage battery 203, such that the temperature Tbat of the storage battery 203 becomes higher by a predetermined temperature or more than the absolute lower limit temperature T1. As a result, the heater 215 is not operated for a while after the parking has been started, but regularly operated after the temperature Tbat of the storage battery 203 has fallen to the absolute lower limit temperature T1.

Figure 13:
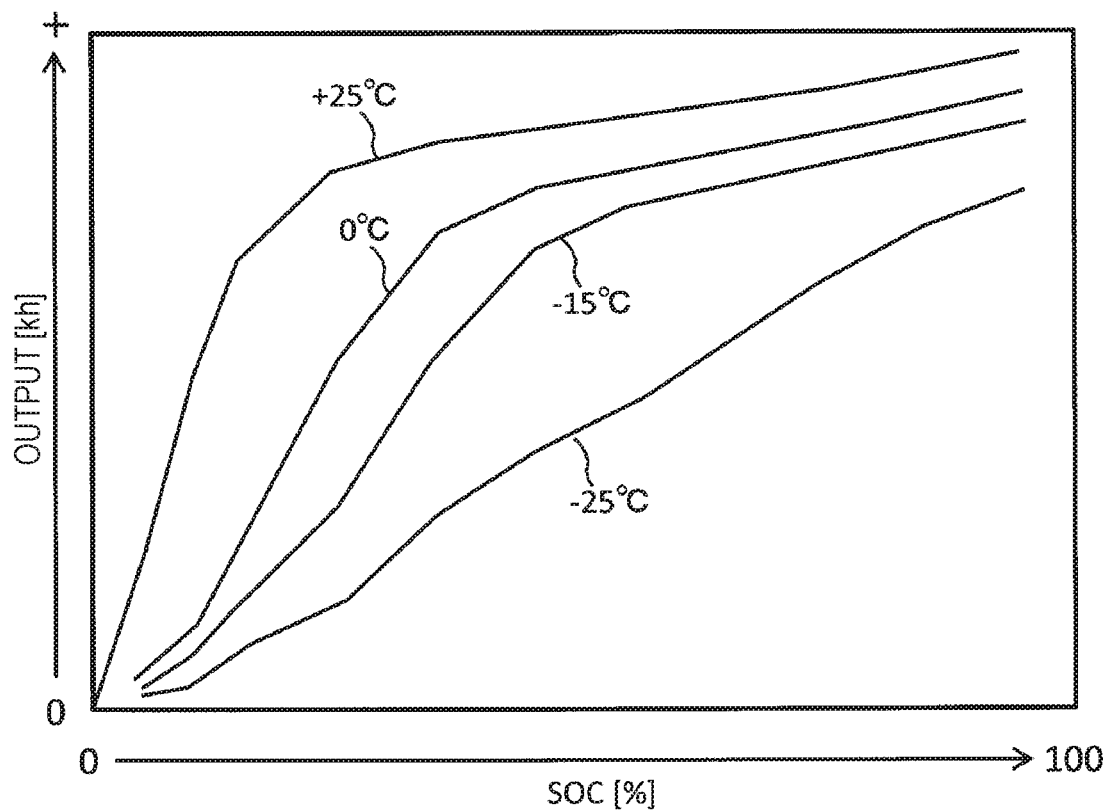
FIG. 13 is a graph illustrating an output corresponding to the temperature and SOC of the storage battery.
Figure 14:
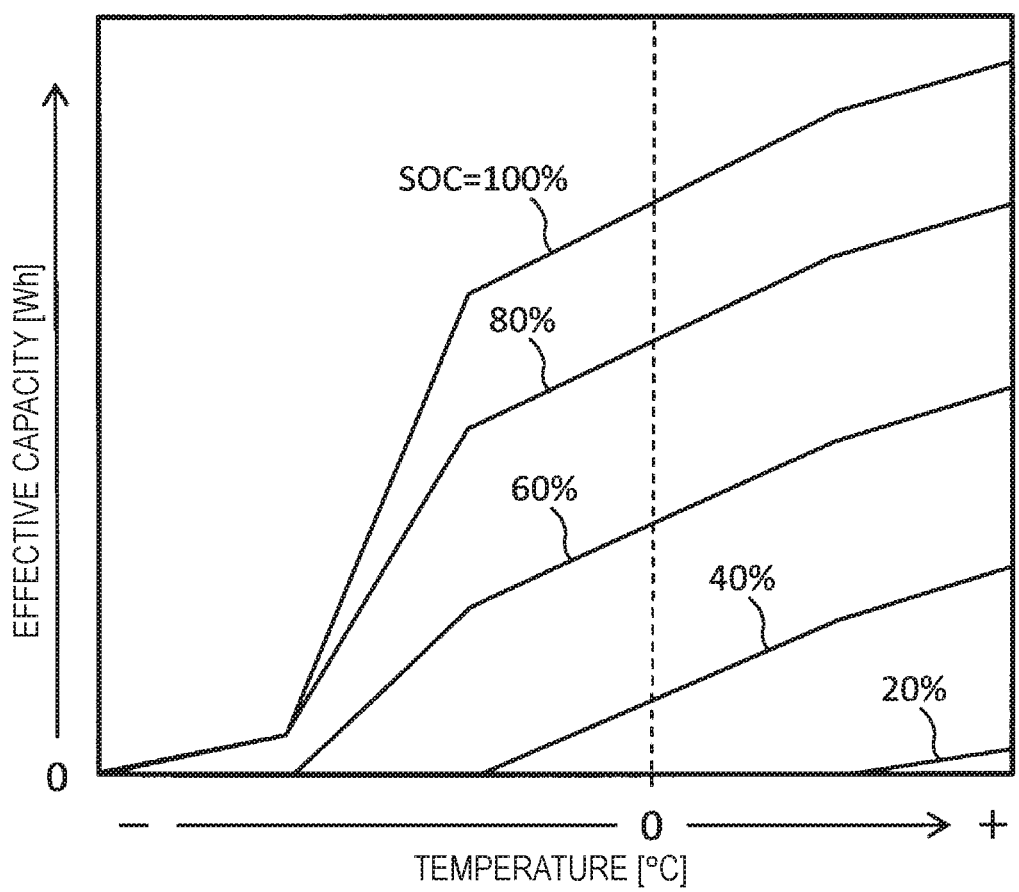
FIG. 14 is a graph illustrating an effective capacity corresponding to the temperature and SOC of the storage battery.

As illustrated in FIG. 13, however, the output of the storage battery 203 is reduced with the decrease of the temperature Tbat, even though the same SOC is applied. Therefore, the ECU 221 according to the present example lowers the lower limit temperature Tc of the storage battery 203 to the absolute lower limit temperature T1 in a stepwise manner, according to the duration of the parking after the parking has been started. Whenever the temperature Tbat of the storage battery 203 falls to the lower limit temperature Tc, the ECU 221 controls the current flowing of the heater 215 using power supplied from the storage battery 203. At this time, the ECU 221 closes the switch units 217 and 219 to cause current to flow through the heater 215 using power supplied from the storage battery 203, such that the temperature Tbat of the storage battery 203 becomes higher by a predetermined temperature or more than the lower limit temperature Tc. Simultaneously, the ECU 221 lowers the lower limit temperature Tc by one step. As such, by raising the temperature of the storage battery 203 whenever the temperature Tbat of the storage battery 203 falls to the lower limit temperature Tc, the temperature Tbat of the storage battery 203 falls over time while rising and falling.

According to the present example, even when the electric motor vehicle is continuously parked for a long time under an extremely low-temperature environment, the lower limit temperature Tc of the storage battery 203 falls in a stepwise manner. Therefore, whenever the temperature Tbat of the storage battery 203 falls to the lower limit temperature Tc, the temperature of the storage battery 203 is raised by a predetermined value, such that the temperature Tbat of the storage battery 203 falls over time while rising and falling. Accordingly, the time during which the output of the storage battery 203 after the parking is improved can be lengthened. Furthermore, since the amount of power consumed by the heater 215 in the present example is smaller than in the comparative example, it is possible to reduce power consumption required for maintaining the storage battery 203 at the absolute lower limit temperature T1 or more.

Although various embodiments have been described for illustrative purposes, it will be apparent to those skilled in the art that various changes and modifications may be made without departing from the spirit and scope of the invention as defined in the following claims.

The invention claimed is:

1. A power consumption control device comprising:
a storage battery configured to supply power to an electric motor serving as a driving source of a plug-in electric motor vehicle;
a heating unit configured to heat the storage battery using heat generated through current flowing;
a power conversion unit configured to convert power supplied from an external power supply, and perform at least either charging the storage battery or causing current to flow through the heating unit;
an effective capacity estimation unit configured to estimate a change in effective capacity of the storage battery when the heating unit generates heat through current flowing due to the power supplied from the external power supply and raises the temperature of the storage battery to a target temperature, based on the effective capacity of the storage battery corresponding to the temperature and a state of charge (SOC) of the storage battery; and
a first controller configured to control usage of the power converted by the power conversion unit according to the change of the effective capacity estimated by the effective capacity estimation unit, wherein:
the change of the effective capacity estimated by the effective capacity estimation unit includes a change from an effective capacity corresponding to the temperature and the SOC of the storage battery before being heated by the heating unit to an effective capacity corresponding to the target temperature and the SOC of the storage battery; and
when the change of the effective capacity increases by a predetermined amount or more, the first controller causes current to flow to the heating unit from the external power supply until the temperature of the storage battery reaches the target temperature.

2. The power consumption control device according to claim 1, wherein
when the temperature of the storage battery is lower than a lower limit temperature and the change of the effective capacity increases by less than the predetermined amount, the first controller causes current to flow to the heating unit from the external power supply until the temperature of the storage battery reaches the lower limit temperature, and charges the storage battery with power acquired from the external power supply after the temperature of the storage battery reaches the lower limit temperature.

3. The power consumption control device according to claim 1, further comprising:
a charging controller configured to control the power conversion unit to start the charging of the storage battery at a designated time; and
a second controller configured to cause current to flow to the heating unit from the external power supply such that the temperature of the storage battery reaches the lower limit temperature until the designated time, when the temperature of the storage battery is lower than the lower limit temperature before the designated time, and cause current to flow to the heating unit while charging the storage battery with power from the external power supply, after the designated time.

4. The power consumption control device according to claim 3, wherein
when the SOC of the storage battery after the designated time exceeds a predetermined value, the second controller charges the storage battery without causing current to flow through the heating unit using power acquired from the external power supply.

5. The power consumption control device according to claim 1, further comprising:
a temperature measurement unit configured to measure an ambient temperature of the electric motor vehicle; and
a third controller configured to cause current to flow to the heating unit from the external power supply until the temperature of the storage battery reaches a predetermined temperature lower than the target temperature, when the temperature of the storage battery is lower than the target temperature and the ambient temperature is higher than the target temperature.

6. The power consumption control device according to claim 1, further comprising:

an internal resistance calculation unit configured to calculate internal resistance of the storage battery; and a fourth controller configured to correct the target temperature of the storage battery heated by the heating unit to a lower temperature as the internal resistance increases.

7. The power consumption control device according to claim 6, wherein the correction amount of the target temperature by the fourth controller is increased as the SOC of the storage battery before being heated by the heating unit is lower.

8. The power consumption control device according to claim 1, wherein the power conversion unit is connected to the external power supply.

* * * * *